United States Patent
Reimann

[19]

[11] Patent Number: 6,067,807
[45] Date of Patent: May 30, 2000

[54] ABSORPTION MACHINE WITH REFRIGERANT MANAGEMENT SYSTEM

[75] Inventor: Robert C. Reimann, LaFayette, N.Y.

[73] Assignee: Carrier Corporation, Syracuse, N.Y.

[21] Appl. No.: 09/244,910

[22] Filed: Feb. 4, 1999

[51] Int. Cl.[7] .................................................. F25B 15/00
[52] U.S. Cl. .............................................. 62/141; 62/476
[58] Field of Search ...................... 62/141, 476

[56] References Cited

U.S. PATENT DOCUMENTS

| | | | |
|---|---|---|---|
| 3,864,930 | 2/1975 | Hopkins | 62/141 X |
| 5,592,825 | 1/1997 | Inoue | 62/141 |
| 5,752,388 | 5/1998 | Hoshino et al. | 62/141 |

FOREIGN PATENT DOCUMENTS 62-178858  2/1986  Japan .

*Primary Examiner*—Henry Bennett
*Assistant Examiner*—Chen-Wen Jiang
*Attorney, Agent, or Firm*—Wall Marjama Bilinski & Burr

[57] ABSTRACT

A refrigerant management system for use in an absorption cooling and heat machine that includes a holding tank for storing a given amount of refrigerant that is bled from the refrigerant supply line for bringing refrigerant from the evaporator sump into the evaporator header. A return line is located in the top of the tank which returns refrigerant from the tank to the sump when the tank is filled. A drain line containing a control valve is located in the bottom of the tank which, when opened, rapidly discharges the contents of the tank into the sump when the system demands additional refrigerant.

9 Claims, 3 Drawing Sheets

… … …

ABSORPTION MACHINE WITH REFRIGERANT MANAGEMENT SYSTEM

BACKGROUND OF THE INVENTION

This invention relates to absorption air conditioning, and, in particular, to a refrigerant management system for use in an absorption heating and cooling machine.

As is well known, in an absorption heating and cooling system, a refrigerant is initially brought together with an absorbent capable of holding a high concentration of refrigerant to produce a solution suitable for use in the process. Under certain operating conditions, the amount of refrigerant necessary to keep the system running efficiently may vary. Typically, a sufficient amount of refrigerant is stored in the machine so that it is available to meet the demands during these peak operation periods. Allowing the amount of available refrigerant to become depleted will cause the refrigerant pump to cavitate or produce crystallization of the absorbent.

Although it is possible to store excessive amounts of refrigerant in an absorption machine to meet peak load demands, this practice is not only space consuming, but also economically impractical.

In an unexamined Japanese application assigned to Ebara Ltd. of Tokyo, Japan (62-178858) there is disclosed an absorption machine in which the gravity flow of liquid refrigerant between the system condenser and the system evaporator is controlled in response to certain sensed system related conditions, such as, the solution temperature as it is leaving the absorber. A reservoir for liquid refrigerant is provided inside the condenser and the refrigerant is metered to the evaporator through a first flow path under normal operating conditions. Upon the sensing of an operational condition that demands more than normal amounts of refrigerant, a second flow path in the reservoir is opened which draws the condenser reservoir to the evaporator. Although this system solves some of the problems associated with refrigerant management in an absorption machine, it nevertheless requires a relatively large refrigerant storage area in the condenser unit. Because the reservoir is confined to the evaporator, it provides little flexibility in relocating the reservoir into more practical and convenient machine locations.

SUMMARY OF THE INVENTION

It is a primary object of the present invention to improve absorption heating and cooling systems.

It is a further object of the present invention to improve the management of refrigerant within an absorptive machine.

A still further object of the present invention is to compact the size of an absorption heating and cooling system.

Yet another object of the present invention is to reduce the amount of available refrigerant needed in an absorption machine evaporator sump.

Still another object of the present invention is to prevent cavitation of the refrigeration pump during certain periods of high refrigerant demands.

It is a further object of the present invention to prevent crystallization of the absorbent used in an absorption heating and cooling system by proper management of the available refrigerant in the system.

Yet a further object of the present invention is to provide greater flexibility in the storage and availability of refrigerant in an absorption machine.

These and other objects of the present invention are attained by means of apparatus for enhancing the management of a refrigerant within an absorption heating and cooling machine that includes a condenser mounted over an evaporator so that liquid refrigerant developed in the condenser is gravity fed into the spray system of the evaporator where the refrigerant is sprayed over the evaporator tubes. A refrigerant pump is arranged to draw liquid refrigerant from the evaporator sump and deliver it back to the evaporator spray system via a supply line for reuse in the evaporator. A holding tank is connected to the refrigerant supply line by a bleed line whereby a portion of the refrigerant being supplied to the evaporator spray system is fed into the tank. A return line is connected into the top part of the tank which returns refrigerant that is collected in the tank above the level of the return line to the evaporator sump. A drain line is located in the bottom of the tank that contains a remotely operated purge valve which, when opened, rapidly drains the tank contents into the evaporator sump making the refrigerant in the tank immediately available for use in the system. The operation of the valve is controlled by a microprocessor that is arranged in certain system conditions that require the availability of additional refrigerant to the system in order to provide for efficient operation of the system while at the same time preventing cavitation of the system pump and unwanted crystallization of the absorbent.

BRIEF DESCRIPTION OF THE DRAWING

For a better understanding of these and other objects of the invention, reference will be made to the following detailed description of the invention, which is to be read in association with the accompanying drawings, wherein.

DETAILED DESCRIPTION OF THE INVENTION

Figure 1:
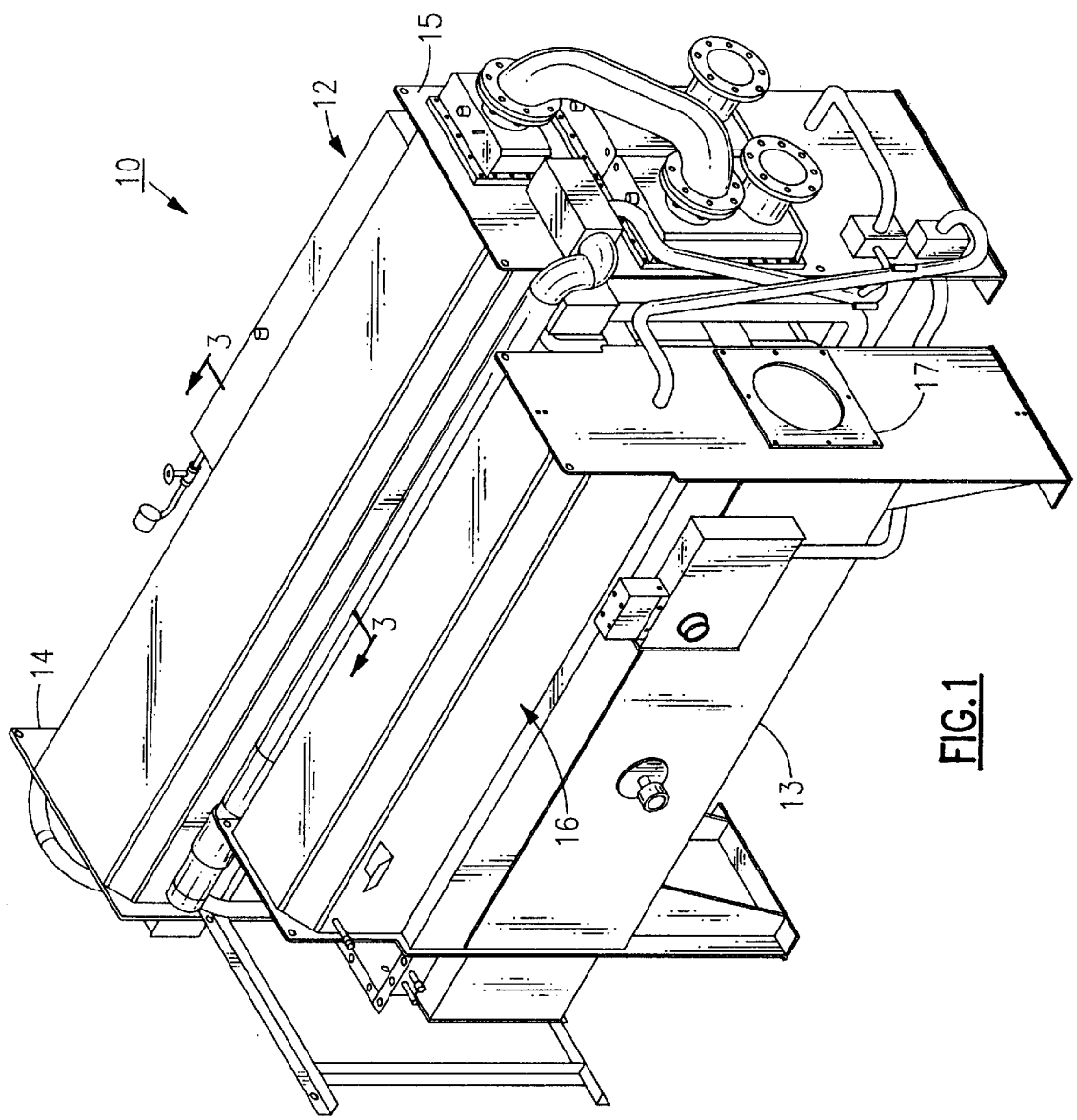
FIG. 1 is a perspective view of a multiple-stage absorption heating and cooling machine embodying the teachings of the present invention.

Referring initially to FIG. 1, there is shown a perspective view of a two-stage absorption heating and cooling machine 10 of the type currently being manufactured by Carrier Corp. of Syracuse, N.Y. The machine includes a larger main section 12 and a smaller second section 13 that is positioned to one side adjacent to the main section. The main section of the machine contains a pair of vertically disposed spaced apart tube sheets 14 and 15 that form an important part of the machine's support structure. The second smaller machine section contains a high temperature generator and a burner for heating a solution that is delivered to the generator from the system absorber which is housed in the main section of the machine along with a second low temperature generator, a condenser, an evaporator and a pair of solution heat exchangers. The heat exchanger tubes of the various components are mounted in axial alignment in the two tube sheets and enclosed within suitable leak tight shells welded to the tube sheets.

Figure 2:
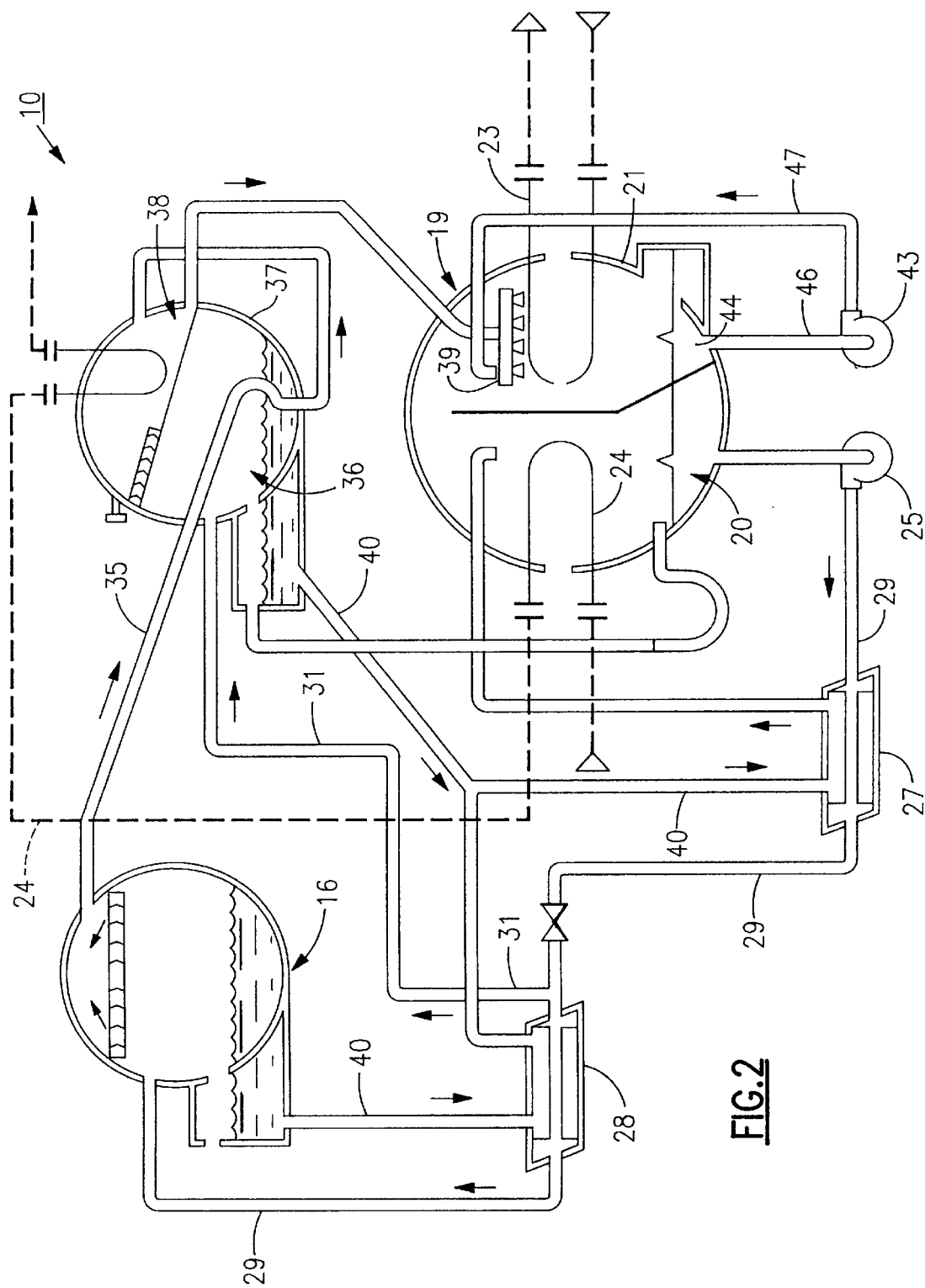
FIG. 2 is a schematic diagram illustrating the absorption machine shown in FIG. 2.

Turning now to FIG. 2, there is illustrated in schematic form the component parts of the absorption system embodied within the machine illustrated in FIG. 1. The operation of the cycle will be described in regard to the machine running in a cooling mode, however, it should be evident to one skilled in the art that the cycle can be adjusted so that the machine can also operate in a heating mode. The present system employs water as a refrigerant and lithium bromide, which has a high affinity for water, as an absorbent.

The machine includes an evaporator 20 and an absorber 19 mounted in a side-by-side relationship within a common shell 21. Liquid refrigerant used in the process is vaporized in the evaporator where it absorbs heat from a substance that is being chilled. The substance being chilled is brought through the evaporator by a chilled water line 23. Vaporized refrigerant developed in the evaporator is passed to the absorber where it is combined with an absorbent to create a solution suitable for use in the process. Heat developed in the absorption process is taken out of the absorber by means of a water line 24.

Weak solution which is rich in refrigerant is drawn from the absorber by means of a solution pump 25. The weak solution is passed in series through a first low temperature solution heat exchanger 27 and a second high temperature solution heat exchanger 28 by means of delivery line 29. As will be explained in greater detail below, the weak solution is brought into heat transfer relationship with strong solution being returned to the absorber from the two generators employed in the system thereby raising the temperature of the weak solution as it moves into the generators.

Upon leaving the low temperature solution heat exchanger, a portion of the weak solution is sent to the low temperature generator 36 via low temperature solution line 31. The remaining weak solution is sent through the high temperature solution heat exchanger 28 on to the high temperature generator 16 via solution line 29. Although not shown in FIG. 2, the weak solution in the high temperature generator is heated by the burner to vaporize the refrigerant and thus, remove it from the solution. The water vapor that is boiled away is passed by means of vapor line 35 into the low temperature generator 36 which is housed in shell 37 along with the system condenser 38. Here, the remainder of the weak solution is heated and the refrigerant contained therein is vaporized by the high temperature refrigerant and delivered, along with the high temperature generator vapor condensate, into the system condenser. In the condenser, the refrigerant vapors are placed in heat transfer relationship with the cooling water passing through line 24 to place refrigerant in a subcooled liquid state.

The condensed liquid refrigerant from the condenser is gravity fed to a spray header 39 located in the top part of the evaporator and sprayed over the chilled water tubes to produce cooling. Strong absorbent solution flows from the two generators back to the absorber to be reused in the absorption cycle. On its return, the strong solution from the high temperature generator is passed through the high temperature solution heat exchanger 28 and then through the second low temperature solution heat exchanger 27 via solution return line 40. Strong solution leaving the low temperature generator is connected into the solution return line by means of a feeder line 42 which enters the return line at the entrance of the second solution heat exchanger.

A refrigerant pump 43 is connected to the sump 44 of the system evaporator by a suction line 46 and is arranged to return liquid refrigerant collected in the sump back to the spray header 39 via supply line 47.

Figure 3:
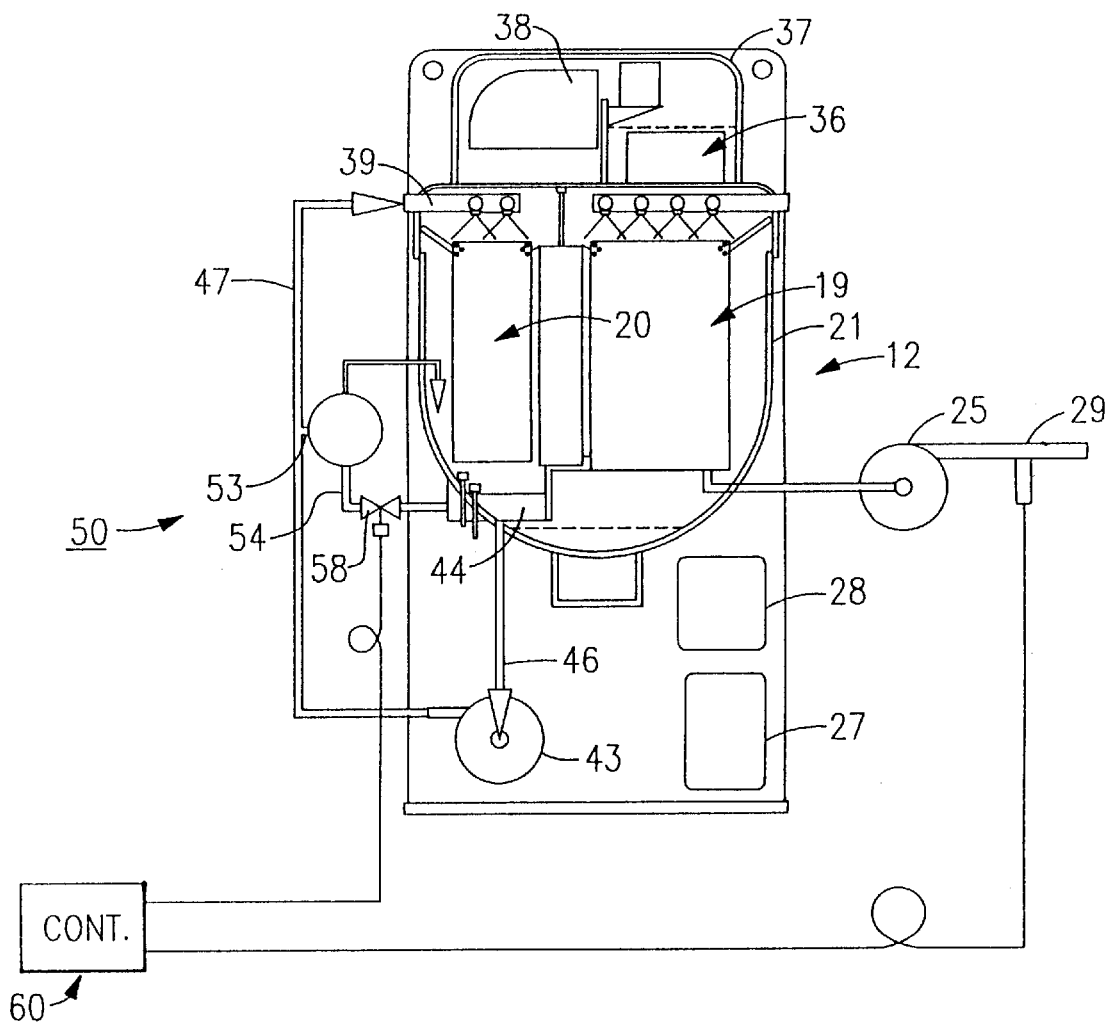
FIG. 3 is a section taken along lines 3—3 in FIG. 1

With further reference to FIG. 3, there is illustrated a sectional view taken through the main section of the absorption machine further illustrating the refrigerant management system 50 embodied therein. A holding tank is mounted in any convenient location within the main machine section of some elevation that is higher than the evaporator sump 44. The tank is connected into the supply line 47 by means of a bleed line 53 so that a portion of the liquid refrigerant being returned to the evaporator spray header 39 is shunted into the tank.

A return line 55 is mounted in the top section of the tank. The return line is arranged to return refrigerant from the tank to the evaporator sump which rises to the level of the return line. Accordingly, under normal operating conditions, an adequate amount of refrigerant is made available to the system to sustain operation of the system without fear of the refrigerant pump cavitating or the absorbent crystallizing.

A drain line 54 is located in the bottom of the holding tank that contains a remotely operated control valve 58. The control valve is electrically connected to a controller 60 which is programmed to open the valve and drain the contents of the holding tank into the evaporator sump upon the sensing of certain system conditions that require the availability of a further supply of refrigerant. The cross-sectional area of the drain line is relatively larger than that of the bleed line so that the tank can be rapidly emptied into the evaporator sump. As illustrated in FIG. 3, a temperature sensor 62 is mounted in the discharge line 29 of the solution pump 25 and is arranged to send temperature information relating to the weak solution leaving the absorber back to the controller. In the event the solution temperature falls below a given value indicating the system is in need of additional refrigerant, the controller will immediately open the control valve to provide the necessary refrigerant to the system to maintain optimum operating conditions.

The controller is also arranged to monitor further system related conditions which might also demand the opening of the control valve. These may include changing the machine operation mode from cooling to heating. The condition of the cooling substance temperature in line 24 may also be monitored and the control valve opened when the cooling water temperature falls below a predetermined value. Similarly, the refrigerant level in the evaporator sump may also be monitored and the control valve opened in the event the amount of refrigerant in the sump becomes low.

While the present invention has been particularly shown and described with reference to the preferred embodiment, as illustrated in the drawing, it will be understood by one skilled in the art that various changes in detail may be effected therein without departing from the spirit and scope of the invention as defined by the claims.

We claim:

1. A refrigerant management apparatus for use in an absorption air conditioning machine that includes:

an evaporator means, and absorber means, a generator means and a condenser means that are interconnected to provide an absorption cycle;

said evaporator means further including a sump for collecting refrigerant that has passed over heat exchanger tubes in said evaporator means;

a refrigerant pump having a suction port connected to said sump and a discharge port connected by a supply line to a spray header mounted over the evaporator exchanger tubes whereby refrigerant is sprayed over the evaporator means heat exchanger tubes;

a refrigerant holding tank connected to said supply line by a bleed line whereby a portion of the refrigerant moving through the supply line is passed into the holding tank;

a return line mounted in the upper part of the holding tank for returning refrigerant to the sump when said holding tank is filled to the level of the return line;

a drain line mounted in the bottom of said tank for draining said holding tank directly into said sump, and a control valve mounted in said drain line that is operable to move between an open position wherein refrigerant stored in said holding tank is passed through the drain line into said sump and a closed position wherein refrigerant is restricted from passing through said drain line from said holding tank back to the sump.

2. The apparatus of claim 1 wherein said control valve is a remotely operated valve.

3. The apparatus of claim 2 that further includes a control means for remotely opening and closing said control valve.

4. The apparatus of claim 3 wherein said control means further includes a sensor means for detecting an absorption cycle condition requiring a maximum amount of available refrigerant and means for opening said control valve in response to said sensed condition wherein the refrigerant in said holding tank is drained to said evaporator sump.

5. The apparatus of claim 1 wherein the cross sectional area of the bleed line is less than that of the drain line whereby said holding tank can rapidly drain into said sump when said control valve is opened.

6. The apparatus of claim 4 wherein said sensor means is mounted in a solution line to measure the weak solution temperature leaving the absorber means.

7. The apparatus of claim 4 wherein said sensor is mounted in the evaporator means sump to measure the level of refrigerant in said sump.

8. The apparatus of claim 4 wherein said sensor is mounted in a line carrying a cooling substance to the absorber and condenser to sense the temperature of said cooling substance.

9. The apparatus of claim 4 wherein said sensor is arranged to determine when the operational mode of the machine is changed from a cooling mode to a heating mode.

* * * * *